United States Patent [19]
Angwin et al.

[11] 3,978,481
[45] Aug. 31, 1976

[54] ANTI-COLLISION VEHICULAR RADAR SYSTEM

[75] Inventors: James H. Angwin, Merrimack, N.H.; John B. Flannery, Chelmsford, Mass.

[73] Assignee: Merlin A. Pierson, Newton, Mass.

[22] Filed: June 17, 1974

[21] Appl. No.: 479,854

[52] U.S. Cl. .............................. 343/7 VM; 343/14
[51] Int. Cl.² ......................................... G01S 9/24
[58] Field of Search ........................... 343/7 VM, 14

[56] References Cited
UNITED STATES PATENTS

| | | | |
|---|---|---|---|
| 3,448,822 | 6/1969 | La Lone et al. | 343/7 VM X |
| 3,710,383 | 1/1973 | Cherry et al. | 343/7 VM |
| 3,725,921 | 4/1973 | Weidman et al. | 343/7 VM |
| 3,766,554 | 10/1973 | Tresselt | 343/14 |
| 3,778,826 | 12/1973 | Flannery et al. | 343/7 VM |

Primary Examiner—T.H. Tubbesing
Attorney, Agent, or Firm—Robert F. O'Connell

[57] ABSTRACT

A radar system mounted on a vehicle and having an RF signal transmitted preferably in a confined beam in front of the vehicle and reflected from obstacles in the path of the beam to be reflected back to the vehicle. The system includes an asymmetrical magic tee which receives both the transmitted and received signals and provides a pair of Doppler frequency signals whose relative phase relationship determines whether the signal is an opening or closing Doppler signal. The signal employs a diplex Doppler detection scheme for providing both range and rate data. Under an imminent collision situation the system provides control signals to power means for pulsating the brakes of the vehicle to thereby avoid a collision. To minimize false target detections and to provide target discrimination, there is provided in this system both a range gated circuit for detecting normal closing rates and an amplitude gated circuit that is operable primarily for detecting fast closing rates such as may occur when a vehicle is stopped in the roadway. A ground speed detector is provided and has an output analog voltage which is usable as a gain control voltage for the range and amplitude gated circuits. The system is also provided with means for inhibiting braking action below a predetermined vehicle speed for use in slow traffic, and means for altering the braking action at speeds above a predetermined speed such as on the order of 35 MPH.

16 Claims, 9 Drawing Figures

ANTI-COLLISION VEHICULAR RADAR SYSTEM

FIELD OF THE INVENTION

The present invention relates in general to a radar system which is mounted to a vehicle for preventing collision of the vehicle with other vehicles. More particularly, the present invention relates to an anti-collision vehicular radar system preferably employing an asymmetrical magic tee and of the type employing a diplex Doppler detection scheme.

BACKGROUND OF THE INVENTION

U.S. Pat. No. 3,778,826 which is assigned to the assignee of the present application, teaches the use of an asymmetrical magic tee in an anti-collision vehicular radar system to provide phase information that can be readily detected to determine whether there is an opening or closing between the vehicle and obstacle which may be another vehicle. Work has also been accomplished by James E. Stevens and Louis L. Nagy as set forth in a paper entitled "Diplex Doppler Radar For Automotive Obstacle Detection" presented at the IEEE Vehicular Technology Group Conference on Dec. 6th, 1972, in Dallas Texas. This report analyzes the diplex Doppler technique which requires the use of two slightly different RF frequencies which are similarly transmitted by the radar, reflected off the vehicle, received by the radar and each mixed with its corresponding transmitted signal. An interesting relationship is found to exist wherein there is a phase difference between the signals of different RF frequencies which is a function of the exact difference frequency and more importantly the range from the vehicle to the obstacle.

However, it is noted in this report that with systems that are existing of this type there are a number of problems that have not been solved. For example, the prior art systems do not provide for adequate target discrimination and may be responsive to false conditions such as the presence of a relatively large overhead or roadside sign. In addition to discriminating between targets of different size, these prior art systems are also susceptible to detecting obstacles out of the path of the vehicle.

Accordingly, one object of the present invention is to provide an improved anti-collision vehicular radar system that overcomes the heretofore mentioned problems associated with the prior art systems. The system of the present invention is responsive primarily only to obstacles in the path of the vehicle and is not responsive to roadside obstacles including even relatively large roadside or overhead signs.

Another object of the present invention is to provide an improved anti-collision radar system that uses a diplex Doppler detection technique and that also measures vehicle speed relative to the ground which is useable in the system as a gain control.

A further object of the present invention is to provide for the system of this invention improved brake control means for pulsating the brakes in one of two different modes.

Still a further object of the present invention is to provide means for inhibiting brake application unless the detected vehicle speed is above a predetermined speed.

SUMMARY OF THE INVENTION

To accomplish the foregoing and other objects of this invention, there is disclosed herein a vehicular radar system for automatically decelerating or stopping a vehicle to avoid a collision with an obstacle. The system generally comprises a transmitter-receiver means including transmitting and receiving antennas mounted on the vehicle for transmitting an electromagnetic signal forward of the vehicle in the path of the vehicle and receiving reflections of the transmitted signal from an obstacle in the path. The transmitted signal is received and means are provided for combining the signal to provide a pair of Doppler frequency signals whose relative phase relationship is indicative of either a closing or opening condition between the vehicle and obstacle. This combining means for providing the Doppler frequency signals preferably includes an asymmetrical magic tee as disclosed in U.S. Pat. No. 3,778,826. In accordance with the diplex Doppler technique means are provided for modulating the transmitted signal at two slightly different frequencies which are higher in frequency than the Doppler frequency.

In association with this modulating or multiplexing means there is also provided in the system means for demultiplexing the pair of Doppler frequency signals to provide a first signal indicative of range between the vehicle and obstacle and a second signal whose frequency is indicative of closure rate. With the use of an asymmetrical magic tee if there is an opening between the vehicle and obstacle there is a phase difference that is not detected by the circuitry of the system. The speed of the vehicle relative to the ground is also detected in the system of this invention and there is provided preferably an analog signal corresponding to vehicle speed. Means are provided for coupling this signal to the demultiplexing means for controlling the gain thereof.

In the disclosed embodiment this demultiplexing means includes a range gated circuit and an amplitude gated circuit. The range gated circuit is primarily for detecting normal closing rates and the amplitude gated circuit is operable primarily for detecting fast closing rates such as when a vehicle is stopped in the roadway. By providing these two circuits for detecting different portions of the Doppler spectrum the system of this invention provides improved target or obstacle discrimination.

Another aspect of the present invention is concerned with the control of the braking system of the vehicle. Means are provided for inhibiting braking action below a predetermined ground speed which is an advantageous feature when travelling in very slow traffic. Another aspect is concerned with pulsating the brakes with means being provided for controlling this pulsation in one of at least two different modes wherein the changeover from one mode to the other may be controlled by a vehicle speed relative to the ground.

DESCRIPTION OF THE DRAWINGS

Numerous other objects, features and advantages of the invention will now become apparent upon a reading of the following detailed description taken in conjunction with the accompanying drawings, in which.

DETAILED DESCRIPTION

Figure 1:
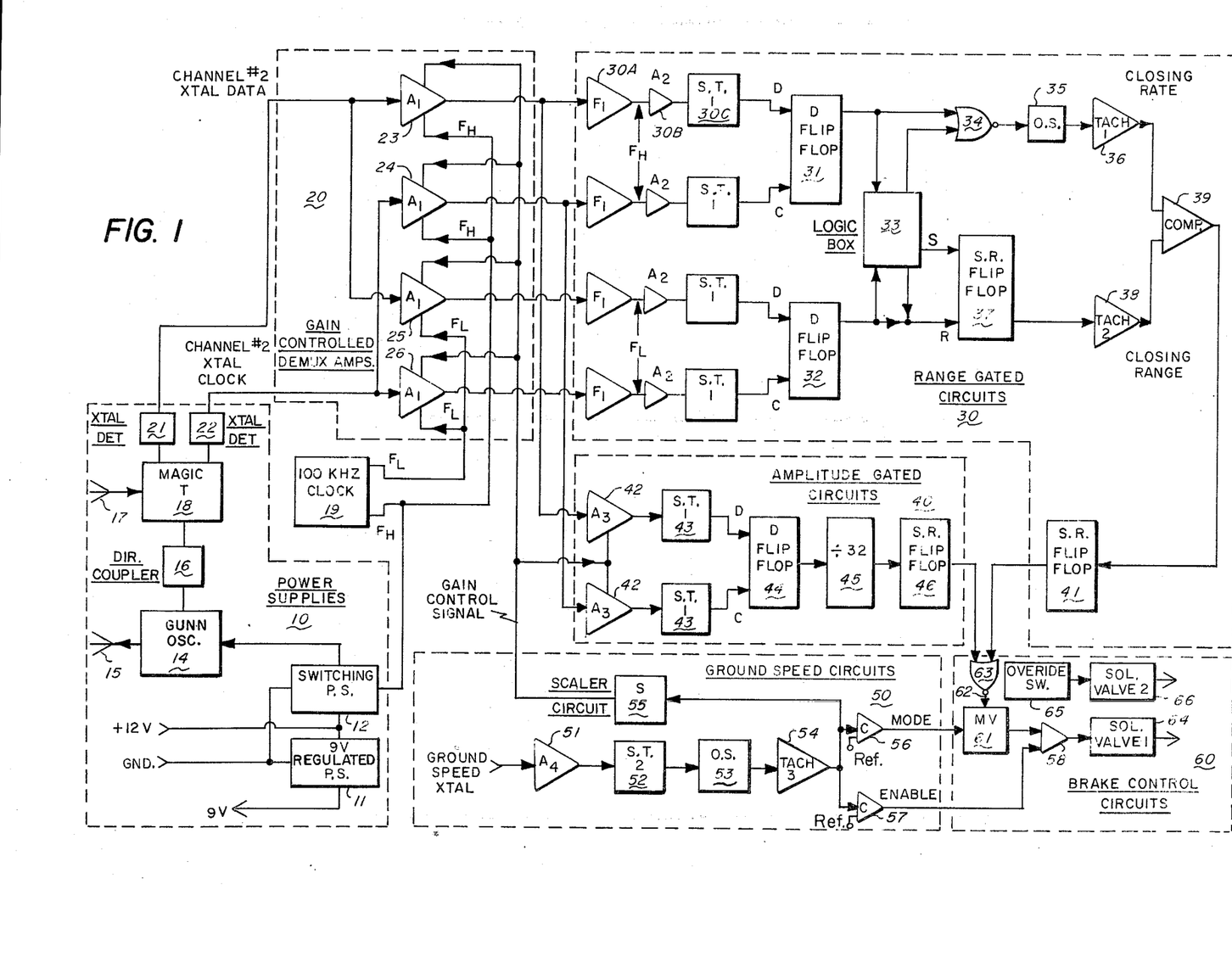
FIG. 1 is a block diagram of a system of the present invention.

FIG. 1 is a block diagram of one embodiment of the system of the present invention. In addition to the components shown in this diagram there may also be associated with the system a readout section which is not shown in detail herein. This readout section provides the driver of the vehicle with both displayed range and rate information.

The system of FIG. 1 includes a transmitter-receiver means 10, a gain control demultiplexer 20, range gated circuit 30, amplitude gated circuit 40, vehicle speed circuit 50, and output brake control circuit 60. The transmitter-receiver 10 shown in FIG. 1 includes a regulated power supply 11, a switching power supply 12, a Gunn diode oscillator 14, a directional coupler 16, and an asymmetrical magic tee 18 which may be of the type disclosed in U.S. Pat. No. 3,778,826. The diplex Doppler technique is practiced with the use of the 100K Hertz clock 19 which has its output coupled to the switching power supply 12 for sequentially biasing the Gunn diode oscillator at slightly different frequencies. For example, the operating frequency of the Gunn diode may be on the order of 10 Giga Hertz and the switching power supply 12 may have a change in bias of the Gunn diode oscillator that causes a frequency spread between the high and low frequencies of for example, 1.5 megahertz.

Most of the energy from the oscillator 14 is coupled into the transmitter antenna 15. The transmitter antenna 15 and a receiver antenna 17 are positioned in the forward portion of the vehicle. These antennas are highly directive so that they transmit energy and are sensitive to energy received from a relatively small angular sector directly in front of the vehicle. This is one way in which the radar system discriminates against obstacles or traffic in adjoining traffic lanes or off to the side of the roadway. Any obstacle in front of the vehicle reflects the transmitted energy back to the vehicle where it is received on the receiver antenna 17. This energy is coupled into the four terminal microwave device which is shown in the block diagram as the magic tee 18. The U.S. Pat. No. 3,778,826 teaches the use of an asymmetrical magic tee in a system of this type. The received energy from antenna 17 is coupled in on the H arm of the tee. A small portion of the RF energy generated from oscillator 14 is coupled by way of directional coupler 16 into the E arm of the magic tee. The asymmetry of the magic tee provides a unique phase shift in the signals coupled to the output sidearms of the magic tee. In FIG. 1 the output from the sidearms couple to the data and clock inputs to demultiplexer 20.

The phase displaced signals from the sidearms of the magic tee 18 couple, respectively, to crystal detectors 21 and 22. The output from these crystal detectors in turn couple to the demultiplexer 20. The crystal detectors 21 and 22 are actually mounted in the sidearms of the asymmetrical magic tee. These devices may be conventional square law detectors. There are several components to the detected output. Reference is made here to Electronics by Thomas Benjamin Brown; John Wiley and Sons, 1954, page 400. The above reference will show that all components of the detector output are high frequency of the RF type except for one component. The single component which is not RF is the relatively low frequency which is the difference between the transmitted frequency and the received frequency. This is referred to as the Doppler frequency.

In the system shown in U.S. Pat. No. 3,778,826, if an obstacle is present directly in front of the vehicle and if this obstacle has a speed which is different from the vehicle speed, then there will be present at the output of the detectors signals of relatively low frequency, the frequency of which is directly proportional to the relative velocity between the vehicle and the obstacle. Furthermore, in this prior art system there is a unique phase relationship between the signals from the detectors and the sign of the phase relationship is either positive or negative, depending on whether it is opening Doppler or closing Doppler. However, in the present system shown in FIG. 1 the signal from the detectors is a multiplexed signal which has the phase characteristic of the prior art system but which is sequentially operated between two different but closely spaced RF frequencies.

Figures 2A, 2B:
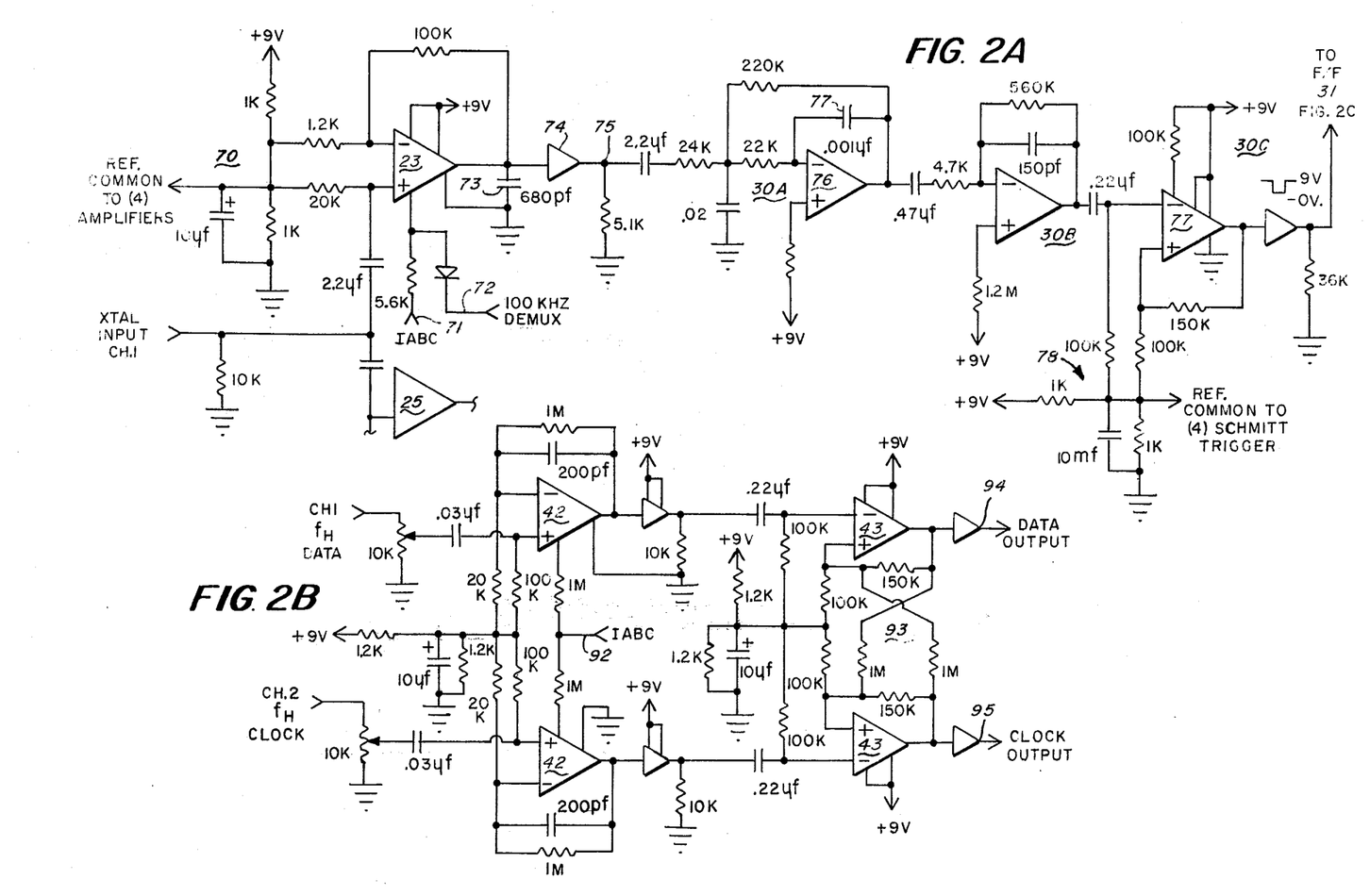
FIGS. 2A–2F show in detail a complete circuit implementation for the diagram shown in FIG. 1.
Figure 4:
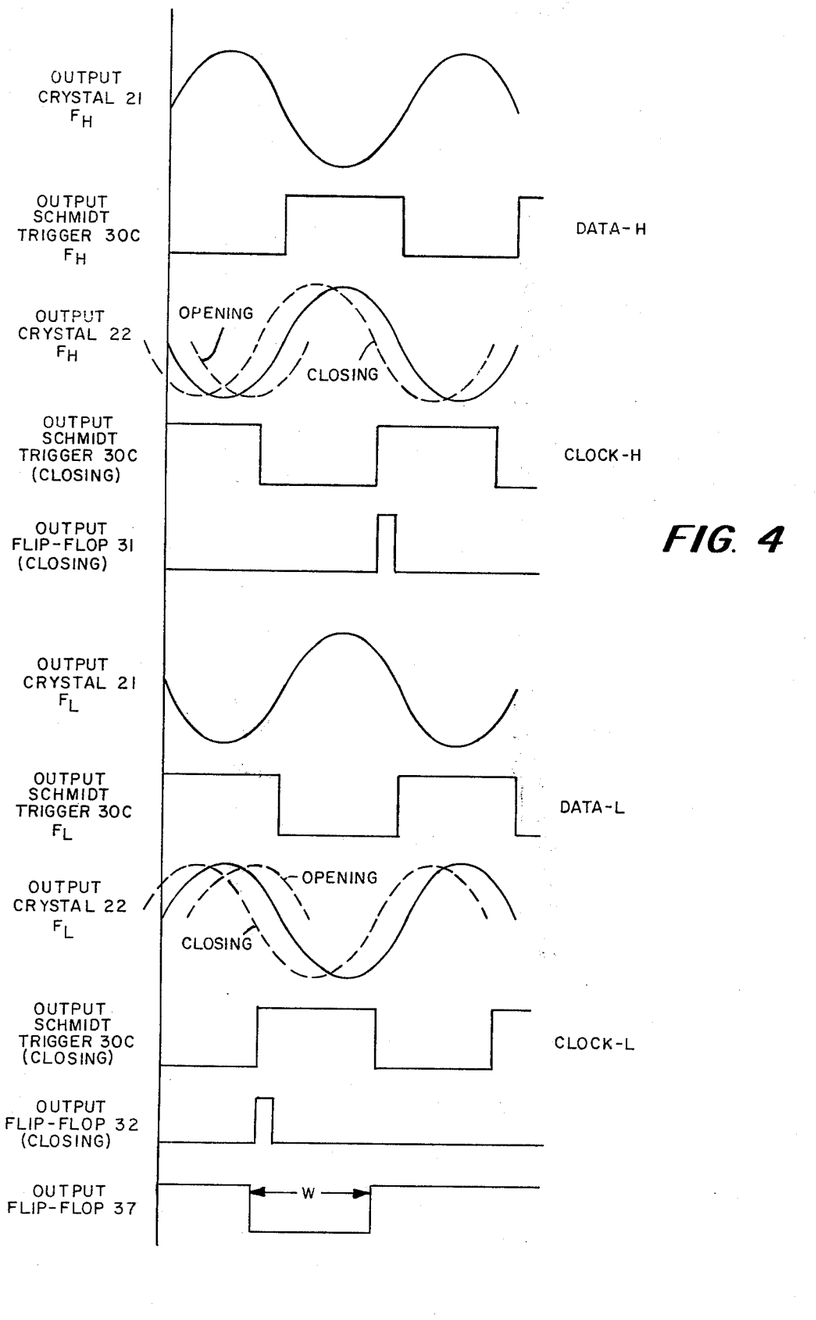
FIG. 4 shows various waveforms associated with the system.

The gain controlled demultiplexer unit 20 includes demultiplexer amplifiers 23, 24, 25 and 26 each of which may be identical in design. FIG. 2A shows the details of these amplifiers. Demultiplexer 20 accomplishes two basic functions of providing an output controlled in accordance with measured vehicle speed or gain control, and demultiplexing the signal received from detectors 21 and 22. It is noted that each of the amplifiers receives a gain control signal from the vehicle speed circuit 50 and also a demultiplexer signal from the oscillator 19. The oscillator 19 generates complimentary signals FH (frequency high) and FL (frequency low). The oscillator in effect sequentially enables respective amplifier pairs 23 and 24; or 25 and 26. FIG. 4 shows the waveforms at the outputs of the four amplifiers comprising unit 20 for one predetermined range. The sign of the phase of the data and clock signals associated with either of the multiplexing frequencies (frequency high or frequency low) corresponds to a closing Doppler signal.

In order to extract the range information the phase difference between the output signals from amplifiers 23 and 25 has to be examined. As previously mentioned, in the paper of Stevens et al, this phase relationship is a direct function of the range between the vehicle and obstacle. The maximum range is given by the equation:

$$R_{max} = \frac{c}{2(F_H - F_L)}$$

where $F_H - F_L$ is a difference frequency which may be 1.5 megahertz, and $c$ is the speed of light. Using this as a difference frequency a maximum range is approximately 327 feet. In FIG. 4 this phase difference is shown as being approximately 180° which would be half-way between the maximum range and zero range.

For simplicity the signals in FIG. 4 are shown as being at some predetermiend amplitude. However, the amplitude of the signals is actually controlled from the vehicle speed circuit 50 which is discussed in more detail hereinafter.

In FIG. 1 the four outputs from the amplifiers of unit 20 couple to identical circuits of the range gated circuit 30 which include a filter 30A, a squaring amplifier 30B and a Schmitt trigger 30C. The filter is a low-pass filter with a cutoff frequency on the order of 1,000 cycles.

This filter therefore does not detect any closing rates in excess of approximately 35MPH. The squaring amplifier 30B and Schmitt trigger 30C provide a squared signal. Details of these components are shown in more detail in FIG. 2A.

The output from the four Schmitt triggers of circuit 30 couple in pairs to flip-flops 31 and 32. The flip-flop 31 receives data and clock signals corresponding to $F_H$ (frequency high) and flip-flop 32 receives data and clock signals corresponding to $F_L$ (frequency low). The output from these flip-flops are shown in FIG. 4. If an opening Doppler signal is received neither of the flip-flops 31 or 32 is operated as the data input then follows the clock input. The data input must be high when the clock occurs to set the flip-flop. The output from both of these flip-flops as shown in FIG. 1 couples to logic box 33 which includes a signal presence detector and steering logic. Box 33 is shown in more detail in FIG. 2C.

The gate 34 receives one signal from logic box 33 and another signal from the output of flip-flop 31. The gate 34 passes signals either directly from flip-flop 31 or by way of box 33 from flip-flop 32. The output from gate 34 is a frequency signal indicative of closure rate. The output from gate 34 couples to a one-shot circuit 35 which operates at the same frequency but with a controlled pulse width. The output from the one-shot 35 couples to a closure rate tachometer 36 whose output is an analog voltage representative of the input frequency to the tachometer 36.

The logic box 33 also selectively passes the output signal from flip-flop 31 to the set input of flip-flop 37. The flip-flop 37 may be reset from the output of flip-flop 32. FIG. 4 shows the output waveform from flip-flop 37 which has a pulse width W corresponding to the phase difference between the DATA-H and DATA-L signals which is in turn a measure of range. The output from flip-flop 37 couples to closing range tachometer 38 which has an analog voltage output corresponding to the pulse width of the output from flip-flop 37. Both tachometers 36 and 38 may be considered as forms of integrators.

Figure 3:
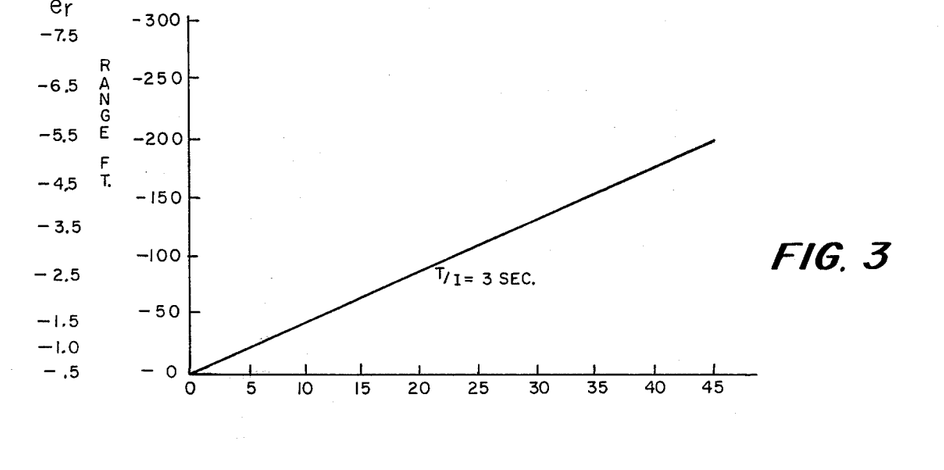
FIG. 3 is a graph associated with the system.

The output from both tachometers 36 and 38 couple to separate inputs of comparator 39 which is the time-to-impact comparator. FIG. 3 shows a graph of the closing rate voltage v. closing range voltage from these tachometers. The slanted line in this graph indicates the changeover of comparator 39 so that for a predetermined closing rate when a predetermined range is reached comparator 39 has an output that couples to flip-flop 41 for setting that flip-flop and providing a signal for the brake control circuit 60 to cause operation thereof.

It is noted in FIG. 1 that the brake control circuit can also be operated from the amplitude gated circuit 40. Circuit 40 is primarily for use at high closing rates such as may occur when an obstacle is stationary in front of the moving vehicle.

The circuit 40 includes a pair of input gain controlled amplifiers 42 each of which couple, respectively, by way of Schmitt triggers 43 to separate data and clock inputs of flip-flop 44. The input to gain controlled amplifiers 42 is from the DATA-H and CLOCK-H signal shown in FIG. 4. The other common input to these amplifiers is the vehicle speed gain control signal from circuit 50. The Schmitt triggers 43 provide a squared signal which is coupled to flip-flop 44.

When the vehicle speed is relatively fast the amplifiers 42 provide a sizeable gain for the input signals coupled to these amplifiers. Therefore, at higher vehicle speeds when an obstacle is encountered the flip-flop 44 is activated. The output from this flip-flop couples to a divider 45 which is in effect a delay means. If the obstacle persists for a certain predetermined period of time which in the disclosed embodiment has been set as a distance of travel of 1.5 feet, then the output from divider 45 sets flip-flop 46. The output from this flip-flop also couples to the brake control circuit 60 for controlling the brakes under that condition.

FIG. 1 also shows the output from a ground speed crystal which is an alternating voltage the frequency of which corresponds to the vehicle speed relative to the ground. To provide this signal a separate transmitter-receiver means operating at a predetermined frequency and directed to the ground may be employed. The signal from the crystal is coupled by way of an amplifier 51, Schmitt trigger 52 and one-shot 53 to a ground speed tachometer 54 which has an output analog voltage corresponding to vehicle speed relative to the ground. This voltage is coupled by way of a scaler circuit 55 which is shown in more detail in FIG. 2D to amplifiers of unit 20 and also the amplifiers of unit 40. In addition, the signal from tachometer 54 is coupled to comparators 56 and 57 both of which also receive different input reference signals. When the analog signal from tachometer 54 reaches a predetermined level, comparator 57 is operated to enable gate 58. This permits braking operation only above a speed of approximately 12 miles per hour.

The comparator 56 has a different reference input than the comparator 57 and the comparator 56 has a first output level when the analog voltage from tachometer 54 is below a predetermined level. The output from comparator 56 switches to a different level when the analog voltage at its input goes above the predetermined level. Thus, the output from comparator 56 controls the mode of the astable multivibrator 61 which comprises a part of the brake control circuit 60. The multivibrator 61 is enabled by way of line 62 from gate 63 which is in turn enabled from either the range gate circuit 30 or the amplitude gate circuit 40. If there are brake enable signals from either of the circuits 30 or 40 they are passed by way of the gate 53 to enable the multivibrator 61 whose output is a series of pulses at a predetermined repetition rate and duty cycle. The input from comparator 56 controls this duty cycle so that the duty cycle is altered at higher vehicle speeds. The signals from multivibrator 61 are passed by way of gate 58 as long as the enable level is present from comparator 57. These signals pass to the solenoid valve 64 which is operable to apply the brakes in accordance with the signals from the multivibrator 61. FIG. 1 also shows as comprising a part of the brake control circuit 60 an override switch 65 and associated solenoid valve 66. When the override switch 65 is operated the solenoid valve 66 inhibits braking operation by the circuitry shown in FIG. 1 so that braking only occurs by way of the vehicle brake pedal and not automatically. This type of operation is discussed hereinafter.

FIGS. 2A - 2F show in detail the circuitry depicted in block form in FIG. 1. FIG. 2A shows one of the channels including amplifier 23, filter 30A, squaring amplifier 30B, and Schmitt trigger 30C. There are actually four channels as shown in the block diagram of FIG. 1 which couple in pairs to the flip-flops 31 and 32 which are shown hereinafter in FIG. 2C.

The demultiplexer amplifier 23 is preferably one made by RCA and identified as their integrated circuit CA3094. This is a transconductance type amplifier having associated therewith at its input a reference circuit 70 which is also common to the other amplifiers 24, 25, the 26. The amplifier 23 includes a gain control input 71 which is coupled from the vehicle speed circuit 50, and a demultiplexing input 72 which is coupled from the 100K Hertz oscillator 19. Regarding amplifier 23, it is the FH (frequency high) signal that is coupled to input 72. In effect when this input is low, for 5 microseconds the amplifier 23 is disabled. When the input goes high the amplifier functions in accordance with the level on gain control input 71. The demultiplexing input thereby assures that only the frequency high signal from the crystal detectors is passed. This signal is impressed across capacitor 73 which blocks the high frequency and passes the signal by way of amplifier 74 to terminal 75. The signal at terminal 75 may be the one shown in FIG. 4 and identified as the DATA-H signal or the inversion thereof.

The signal is then fed to low-pass filter 30A which includes an operational amplifier 76 and associated capacitor 77 for providing filtering. This filter is designed so that its 3DB point is at approximately 1,000 cycles. This filter thereby detects only closing rates of approximately 35 MPH or less.

The signal that is passed by way of filter 30A is coupled to a squaring amplifier 30B which squares the signal. The signal then passes through Schmitt trigger 30C which includes integrated circuit 77 which is also an RCA integrated circuit identical in construction to amplifier 23. In FIG. 2A the circuit 77 is constructed with an external reference circuit 78 so that the circuit 77 functions as a Schmitt trigger which in essense converts the somewhat sinusoidal input to a relatively perfect squarewave. The circuit 77 has a slewing rate of 50 volts per microsecond and thus the signal output from circuit 77 has an extremely fast rise and fall time. It is this signal that is coupled to the flip-flop 31. Again, FIG. 2A shows only one of the channels. There are however, four channels which have four signals coupling, respectively, in pairs to the flip-flops 31 and 32 which are shown in FIG. 2C.

Figure 2C:
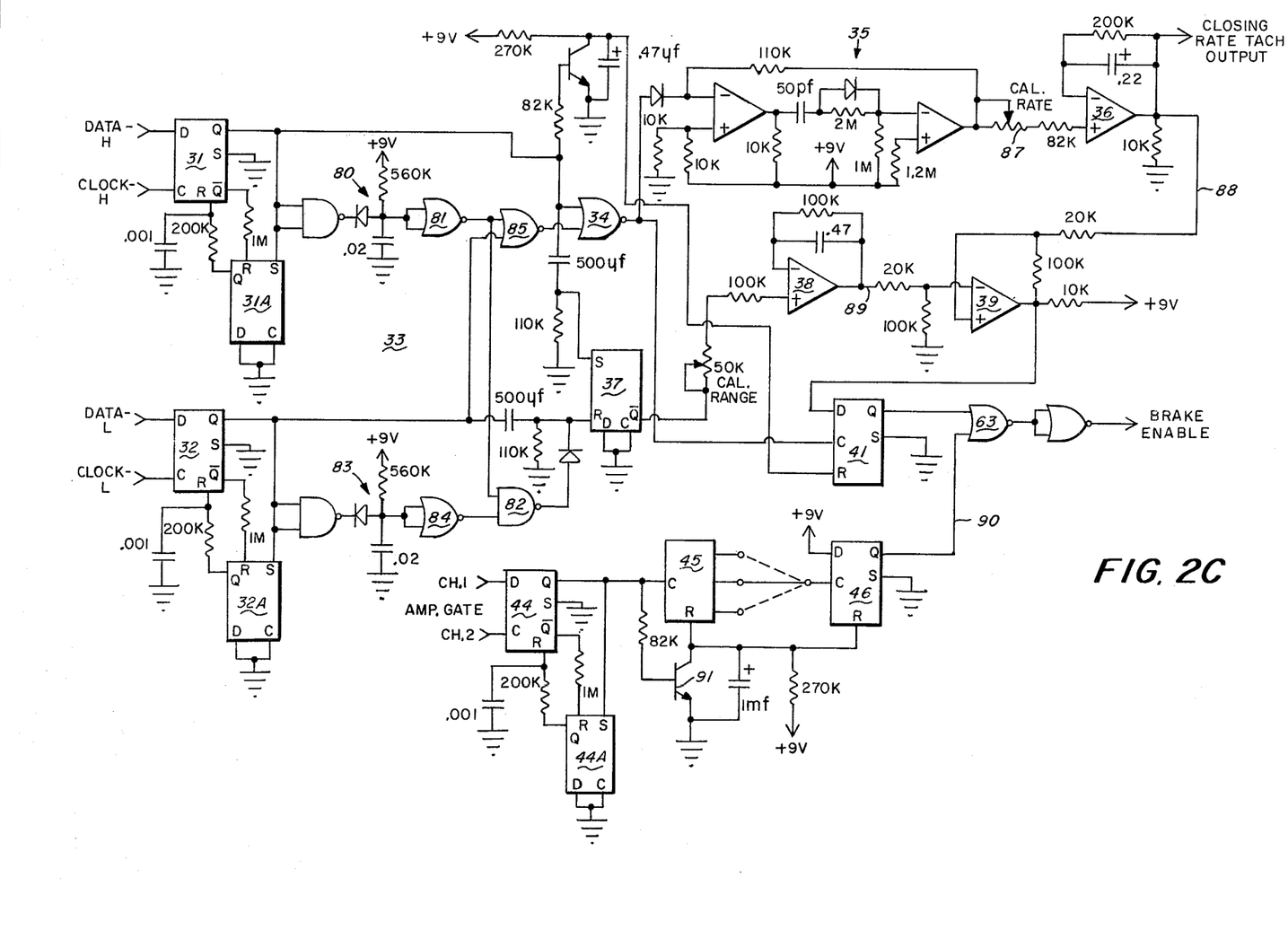

FIG. 2C shows portions of the range gate circuit 30 and amplitude gate circuit 40 including the circuitry that connects to control the brake control circuit 60.

In FIG. 2C the waveforms shown in FIG. 4 are coupled as previously indicated to the flip-flops 31 and 32 each of which has associated therewith resetting flip-flops 31A and 32A, respectively. The output from both of the flip-flops couples to flip-flop 37 shown also in FIG. 1 and also to the logic box 33. As previously indicated, box 33 includes signal presence detection means and also steering logic.

The circuit 80 detects the presence of pulses from flip-flop 31. If there is a closing rate and under the condition of a presence of pulses the output from gate 81 of circuit 80 is at its high level thereby enabling one of the inputs to gate 82.

There is another signal presence detection circuit 83 including a gate 84 whose output is also high when pulses are being generated from flip-flop 32. This condition enables the other input to gate 82. Gate 82 therefore has a low output signal which does not reset flip-flop 37. A high level must exist at the output of gate 82 in order to set flip-flop 37 from that gate. Accordingly, when there are signals at the output of both flip-flops 31 and 32 then the resetting of flip-flop 37 only occurs when a pulse is received directly from flip-flop 32. FIG. 4 shows the time displacement between the pulses from flip-flops 31 and 32. The output from flip-flop 37 (see FIG. 4) is then a pulse width W that is a function of the phase between the signal outputs from the flip-flops 31 and 32 which is in turn a function of the range between the vehicle and obstacle.

The rate information may be coupled from either flip-flop 31 or flip-flop 32. If flip-flop 31 is operating its output is coupled to gate 34 (see also FIG. 1) and from there to the one-shot circuit 35 and tachometer 36 the details of which are depicted in FIG. 2C. Alternatively, if there are no signals being received from flip-flop 31 the output from gate 81 is low thereby enabling the following gate 85. Signals may then be coupled from the output of flip-flop 32 by way of gate 85 to gate 34, the output of which couples to the analog rate circuitry including one-shot 35 and tachometer 36. Normally, the outputs from the two flip-flops 31 and 32 will appear or disappear concurrently. However, there are instances wherein pulses can be received from one of the flip-flops but not from the other. In case only one of the flip-flops is generating pulses then the gate 82 is not enabled and the flip-flop 37 is virtually immediately reset and in effect no range data is interpreted by the system.

As previously indicated, the output pulse train from gate 34 is coupled to a one-shot circuit 35 which has an output calibration potentiometer 87 which controls the charging current to the following integrator. This signal from potentiometer 87 is coupled to tachometer 36 which in effect is an integrator that has an output analog voltage corresponding to the input rate. This output analog voltage is coupled on line 88 to one input of comparator 39. This comparator is the time-to-impact comparator shown in FIG. 1.

FIG. 2C also shows connecting from the output of flip-flop 37, the closing range tachometer 38 which integrates the pulse signal from flip-flop 37 and provides an analog output voltage on line 89 which is coupled to the other input of comparator 39. When the input on line 88 exceeds the input on line 89 then a high signal is coupled from the output of the comparator to the data input of flip-flop 41 which is also shown in FIG. 1. When a clock signal is received from the output of gate 34, flip-flop 41 is set and its high level output is coupled to gate 63 to provide the brake enable signal which is coupled to circuit 60 discussed in more detail hereinafter.

The gate 63 can also provide a brake enable signal by way of line 90 from flip-flop 46 which comprises a part of the amplitude gate circuit 40. FIG. 2B shows the amplifiers 42 which receive the DATA-H and CLOCK-H signals as depicted in FIG. 1. These amplifiers are also of the same type as the amplfiiers 23–26 shown in FIG. 2A. These amplifiers also receive a gain control signal from the scaler circuit 55 shown in FIG. 1. This input is coupled on line 92 to appropriate inputs of the integrated circuits CA3094. The signals from amplifiers 42 couple to respective Schmitt triggers 43 which are basically the same as the type shown in FIG. 2A but further include a phase amplification circuit 93. If, for example, there is a small phase angle between the data and clock signals this circuitry tends to amplify this phase difference. The different phase signals are provided as a square waveform on output lines 94 and 95 and identified as the data and clock outputs, respectively.

Referring again to FIG. 2C it is these two outputs that couple to flip-flop 44. Flip-flop 44 has associated therewith a resetting flip-flop 44A which provides a control output pulse width at the output of flip-flop 44. The rate of the pulses at the output of flip-flop 44 corresponds to the closure rate.

The output from flip-flop 44 as also depicted in FIG. 1 couples to a divider 45 and from there to the flip-flop 46. If the output from flip-flop 44 is of a high enough frequency and the vehicle speed as indicated from the output of scaler 55 provides sufficient gain, then flip-flop 46 is set providing a signal on line 90 which in turn couples a brake enable signal to the brake circuit 60. The transistor 91 and associated capacitor and resistor provide a circuit that is duty cycle sensitive for keeping flip-flop 46 reset at lower frequencies wherein the on-time of transistor 46 is shorter than the off-time.

Figure 2D:
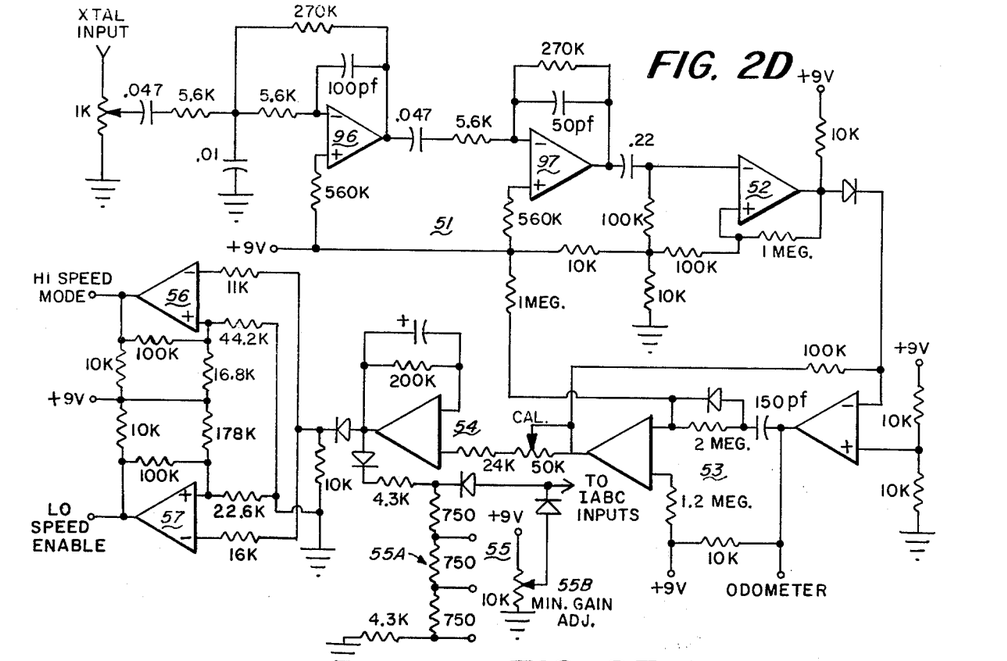

Referring now to FIG. 2D there is shown the vehicle speed circuit 50 which couples from the ground speed crystal as shown in FIG. 1. This signal is an alternating signal whose frequency corresponds with the ground speed relative to the vehicle which in turn corresponds to the vehicle speed relative to the ground. This variable signal is coupled by way of amplifier 51 which includes filter circuit 96 and squaring amplifier 97 to Schmitt trigger 52 and one-shot circuit 53 (see also FIG. 1). The filter 96 has a wider band-pass then the filter 30A shown in FIG. 2A, and thus passes relatively high vehicle speeds. The signal at the output of the one-shot 53 is a controlled pulse width signal which is coupled to tachometer 54 which in essence is an integrator circuit. The output from tachometer 54 couples to the scaler 55 which includes a voltage divider 55A and a minimum adjust potentiometer 55B so that there is some minimum gain of the gain control amplifiers even if there is no ground speed signal.

The output from tachometer 54 also couples to comparators 56 and 57 which, respectively, provide the MODE and ENABLE signals depicted in FIG. 1. These signals couple to the brake control circuitry 60 shown in FIG. 2F. The comparators 56 and 57 have a resistor ladder network associated therewith that provides a controllable amount of hysteresis. For comparator 57 these resistors are chosen so that the enable occurs at say 12 MPH but once it has occurred then the speed must drop to say 3 MPH before the enable stops. For comparator 56 there is also hysteresis between say 30 and 35 MPH. This type of a hysteresis set up is basically conventional.

Figure 2E:
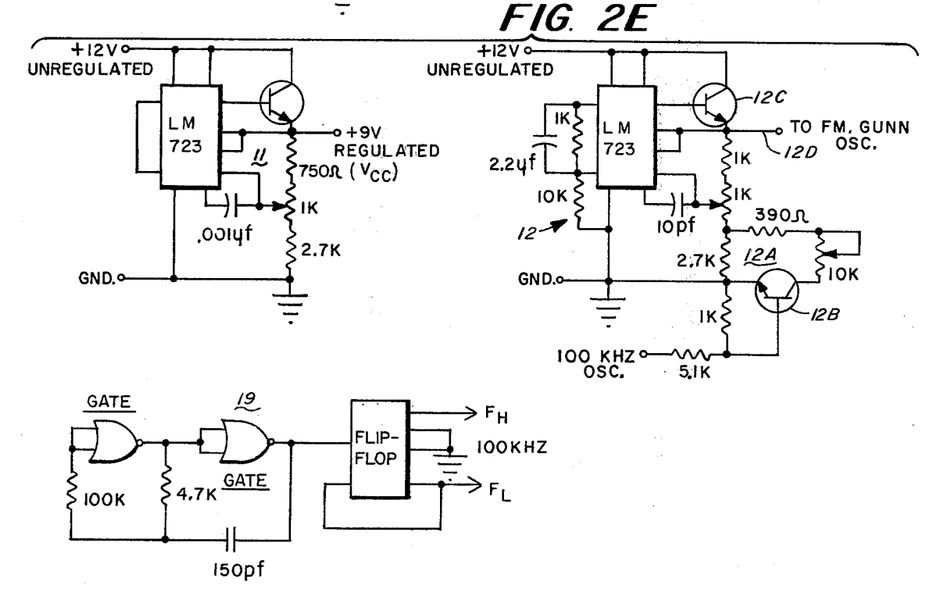
Figure 2F:
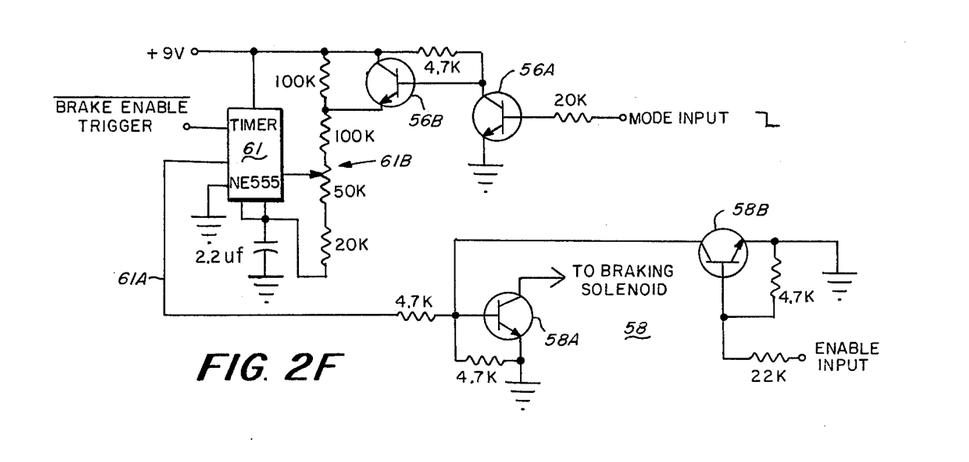

Referring to FIG. 2F there is shown multivibrator 61 which is a conventional timer that is selectably enabled. The timer receives the brake enable signal from gate 63 (FIG. 2C) which enables the timer. The output from the timer couples by way of line 61A to gate 58 which is shown in FIG. 2F as comprising transistors 58A and 58B. If the input ENABLE signal from comparator 57 (FIG. 2D) is at its high level transistor 58B is conductive and transistor 58a is maintained non-conductive so that the brake solenoid is not operated. When the vehicle speed exceeds a predetermined value such as 12 miles per hour then the ENABLE signal goes low turning off transistor 58B and permitting transistor 58A to become conductive and pulse the brake solenoid in accordance with the presence of a brake enable signal to timer 61.

When operating at relatively low vehicle speeds the MODE signal from comparator 56 is high and thus transistor 56A is on and transistor 56B is off. Under those conditions the voltage divider 61B associated with timer 61 is in a first condition setting the timer to operate at a predetermined repetition rate with a relatively high duty cycle of operation. In one case the brakes were pulsed on for 475 milli-seconds and off for 50 milli-seconds. When the MODE signal goes low transistor 56A stops conduction, transistor 56B conducts, the voltage divider is altered by the conduction of transistor 56B and the timer duty cycle is changed so that it is operating at a lower duty cycle. For this case the on time may be 375 milli-seconds and the off time 50 milli-seconds. This means in essence that at higher operating velocities of the vehicle the pulses to the brake solenoid have a shorter duration to thereby reduce skiding possibilities and provide stability.

FIG. 2E shows one embodiment for the oscillator 19 and also shows the power supply 11 which comprises an integrated circuit sold by RCA and identified as their LM 723. The switching power supply 12 also comprises a similar integrated circuit having associated therewith biasing circuitry 12A including transistors 12B and 12C and associated resistors. When the 100 kilohertz signal from oscillator 19 is at its high level transistor 12B is conductive and the voltage divider 12A is in a first condition wherein a predetermined bias voltage is provided by way of line 12D to the Gunn oscillator 14 shown in FIG. 1. When the signal to the base of transistor 12B goes to ground this transistor turns off and the voltage divider assumes a different condition changing the bias level on line 12D so that the oscillator now oscillates at a slightly different frequency. As indicated previously, the bias is adjusted so that the frequency difference is approximately 1.5 megahertz.

There are probably a number of different apparatus that could be employed for operating the brakes from the circuitry shown in FIG. 2F. U.S. Pat. No. 3,778,862 shows one arrangement that can be used.

Having described one system in accordance with this invention it should now become apparent to those skilled in the art that numerous modifications can be made therein all of which are contemplated as falling within the scope of this invention as defined by the appended claims.

We claim:
1. A vehicular radar system for automatically decelerating or stopping a vehicle to avoid a collision with an obstacle, said system comprising:
  transmitter means mounted on the vehicle for transmitting an electromagnetic signal in the path of motion of the vehicle,
  means for receiving the transmitted signal after reflection from an obstacle that may appear in the path of the vehicle,
  means responsive to said transmitted and received signals for providing a pair of doppler frequency signals the relative phase relationship therebetween being asymmetric and indicative of either a closing or opening situation between vehicle and obstacle,
  means for detecting vehicle speed relative to the ground and providing a signal corresponding to vehicle speed, at least a pair of gain-controlled means for receiving respectively the doppler frequency signals and amplifying said doppler frequency signals, means for coupling said vehicle speed signal to both said gain-controlled means for controlling the gain of both said means in accordance with said vehicle speed, and means responsive to the amplified doppler frequency signals from said at least one pair of gain-controlled means when said signals exceed a predetermined frequency for controlling the applying of the vehicle brakes.

2. The system of claim 1 wherein said transmitter means include modulating means for sequentially transmitting a pair of high frequency signals of relatively close frequency, and each said gain-controlled means includes means for demultiplexing the doppler signal, and means coupled from the modulating means to the demultiplexing means of each gain-controlled means to provide a first signal indicative of range and a second signal whose frequency is indicative of closure rate.

3. The system of claim 2 wherein said means for amplifying comprise a control circuit having four outputs for providing a pair of phase displaced signals corresponding to one transmitted frequency and another pair of phase displaced signals corresponding to the other transmitted frequency.

4. The system of claim 3 wherein the four outputs couple to bistable means to provide the first and second signals.

5. The system of claim 4 including a first integrator having an output analog voltage corresponding to closure rate and a second integrator having an output analog voltage corresponding to range.

6. The system of 2 wherein said means responsive to the dopple frequency signals exceeding a predetermined frequency for controlling the applying of the brakes includes a time to impact comparator for receiving said first and second signals respectively, indicative of range and rate.

7. The system of claim 6 including means responsive to either said time to impact comparator or a signal from said amplitude gated circuit for operating said brakes.

8. A system as set forth in claim 1 wherein said means for detecting vehicle speed includes a transmitter-receiver means for detecting vehicle speed relative to the ground.

9. A system as set forth in claim 8 wherein said transmitter-receiver means includes a crystal and means for converting an AC output from the crystal to a DC voltage level.

10. A vehicular radar system for automatically decelerating or stopping a vehicle to avoid a collision with an obstacle, said system comprising;

transmitter means mounted on the vehicle for transmitting an electromagnetic signal in the path of motion of the vehicle, means for receiving the transmitted signal after reflection from an obstacle that may appear in the path of the vehicle, means responsive to said transmitted and received signals for providing a pair of doppler frequency signals whose relative phase relationship is indicative of either a closing or opening situation between vehicle and obstacle, means for detecting vehicle speed relative to the ground and providing a signal corresponding to vehicle speed, means for amplifying said doppler frequency signals, means for coupling said vehicle speed signal to said means for amplifying for controlling the gain of said means for amplifying, an amplitude gated circuit including a pair of gain controlled amplifiers for receiving said pair of doppler frequency signals and means responsive to said signals exceeding a predetermined value for operating said vehicle brakes, and means responsive to doppler frequency signals exceeding a predetermined frequency for controlling the applying of the vehicle brakes.

11. The system of claim 10 including means coupling said vehicle speed signal to said gain controlled amplifiers.

12. The system of claim 11 including filter means responsive to lower frequency doppler signals for detecting only slower closing rates.

13. A vehicular radar system for automatically decelerating or stopping a vehicle to avoid a collision with an obstacle, said system comprising;

transmitter means mounted on the vehicle for transmitting an electromagnetic signal in the path of motion of the vehicle, means for receiving the transmitted signal after reflection from an obstacle that may appear in the path of the vehicle, means responsive to said transmitted and received signals for providing a pair of doppler frequency signals whose relative phase relationship is indicative of either a closing or opening situation between vehicle and obstacle, means for detecting vehicle speed relative to the ground and providing a signal corresponding to vehicle speed, means for amplifying said doppler frequency signals, means for coupling said vehicle speed signal to said means for amplifying for controlling the gain of said means for amplifying, means responsive to doppler frequency signals exceeding a predetermined frequency for controlling the applying of the vehicle brakes, means responsive to the vehicle speed signal exceeding a predetermined low value for enabling said means for controlling the applying of the brakes.

14. A vehicular radar system for automatically decelerating or stopping a vehicle to avoid a collision with an obstacle, said system comprising;

transmitter means mounted on the vehicle for transmitting an electromagnetic signal in the path of motion of the vehicle, means for receiving the transmitted signal after reflection from an obstacle that may appear in the path of the vehicle, means responsive to said transmitted and received signals for providing a pair of doppler frequency signals whose relative phase relationship is indicative of either a closing or opening situation between vehicle and obstacle, means for detecting vehicle speed relative to the ground and providing a signal corresponding to vehicle speed, means for amplifying said doppler frequency signals, means for coupling said vehicle speed signal to said means for amplifying for controlling the gain of said means for amplifying, means responsive to doppler frequency signals exceeding a predetermined frequency for controlling the applying of the vehicle brakes, wherein said means for controlling the brakes includes means for pulsating the brakes at one of at least two different duty cycles.

15. The system of claim 13 including means responsive to the vehicle speed signal exceeding a preselected value for changing to a lower duty cycle rate of pulsating.

16. A vehicular radar system for automatically decelerating or stopping a vehicle to avoid a collision with an obstacle, said system comprising;

means mounted on the vehicle for transmitting an electromagnetic signal in the path of motion of the vehicle, modulating means coupled to said transmitting means for sequentialy transmitting a pair of high frequency signals of relatively close frequency, means for receiving the transmitted signal after reflection from an obstacle that may appear in the path of the vehicle, means responsive to said transmitted and received signals for providing a pair of doppler frequency signals whose relative phase relationship is indicative of either closing or opening between vehicle and obstacle, means for detecting vehicle speed and providing a signal corresponding to vehicle speed, a first pair of gain-controlled means for receiving respectively the pair of doppler frequency signals and amplifying the signals, a second pair of gain-controlled means for receiving respectively the pair of doppler frequency signals and amplifying the signals, means coupling the vehicle speed signal to both pairs of gain-controlled means for controlling the gain thereof, each said gain-controlled means including means for demultiplexing the doppler signals, means coupled from the modulating means to the demultiplexing means of each gain-controlled means for providing a first pair of out-of-phase signals associated with one of the transmitted frequencies from the first pair of gain-controlled means and a second pair of out-of-phase signals associated with the other of the transmitted frequencies from the second pair of gain-controlled means, means responsive to one of said first and second out-of-phase signals to provide a signal indicative of closure rate, and means responsive to doppler signals from the gain-controlled means corresponding to the two transmitted frequencies for providing a signal indicative of closure range.

* * * * *